US012570557B2

(12) United States Patent
Hammonds et al.

(10) Patent No.: US 12,570,557 B2
(45) Date of Patent: Mar. 10, 2026

(54) ERODING ASSEMBLY FOR CHLORINATOR WITH REMOVABLE SIEVE AND WEIR

(71) Applicant: Hammonds Technical Services, Inc., Houston, TX (US)

(72) Inventors: Carl L. Hammonds, Hot Springs Village, AR (US); Jeffrey T. Hammonds, Kingwood, TX (US); Manuel Tamayo, Houston, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 542 days.

(21) Appl. No.: 18/114,598

(22) Filed: Feb. 27, 2023

(65) Prior Publication Data

US 2023/0357061 A1 Nov. 9, 2023

Related U.S. Application Data

(60) Provisional application No. 63/339,727, filed on May 9, 2022.

(51) Int. Cl.
*C02F 1/68* (2023.01)
*B01F 21/00* (2022.01)
*B01F 21/20* (2022.01)
*B01F 101/00* (2022.01)

(52) U.S. Cl.
CPC ............ *C02F 1/688* (2013.01); *B01F 21/221* (2022.01); *B01F 21/504* (2022.01); *B01F 2101/305* (2022.01); *C02F 2303/04* (2013.01); *C02F 2303/14* (2013.01)

(58) Field of Classification Search
CPC .................. B01F 21/221; B01F 21/504; B01F 2101/305; C02F 1/688; C02F 2303/04; C02F 2303/14
See application file for complete search history.

(56) References Cited

U.S. PATENT DOCUMENTS

| | | | |
|---|---|---|---|
| 6,337,024 B1 * | 1/2002 | Hammonds | ........... B01F 25/316 |
| | | | 210/123 |
| 6,544,414 B2 | 4/2003 | Hammonds | |
| 8,459,284 B2 | 6/2013 | Brennan et al. | |
| 10,870,091 B2 | 12/2020 | Dobizl et al. | |

FOREIGN PATENT DOCUMENTS

| | | | | |
|---|---|---|---|---|
| CN | 109987807 A | * | 7/2019 | .............. C02F 11/00 |

OTHER PUBLICATIONS

CN109987807A—EPO Machine Translation (Year: 2025).*
VersaChlor Products System III Package Webpage (Year: 2021).*

* cited by examiner

*Primary Examiner* — Patrick Orme
(74) *Attorney, Agent, or Firm* — James E. Hudson, III; Crain Caton & James, P.C.

(57) ABSTRACT

An eroding assembly for use in water-soluble chemical feeder where a solid chemical material is eroded by water so as to produce a sanitizing solution of dissolved chemical and water having removal components in its structure for ease of cleaning and removal of any undissolved chemical material, particularly the sieve plate and weir.

30 Claims, 9 Drawing Sheets

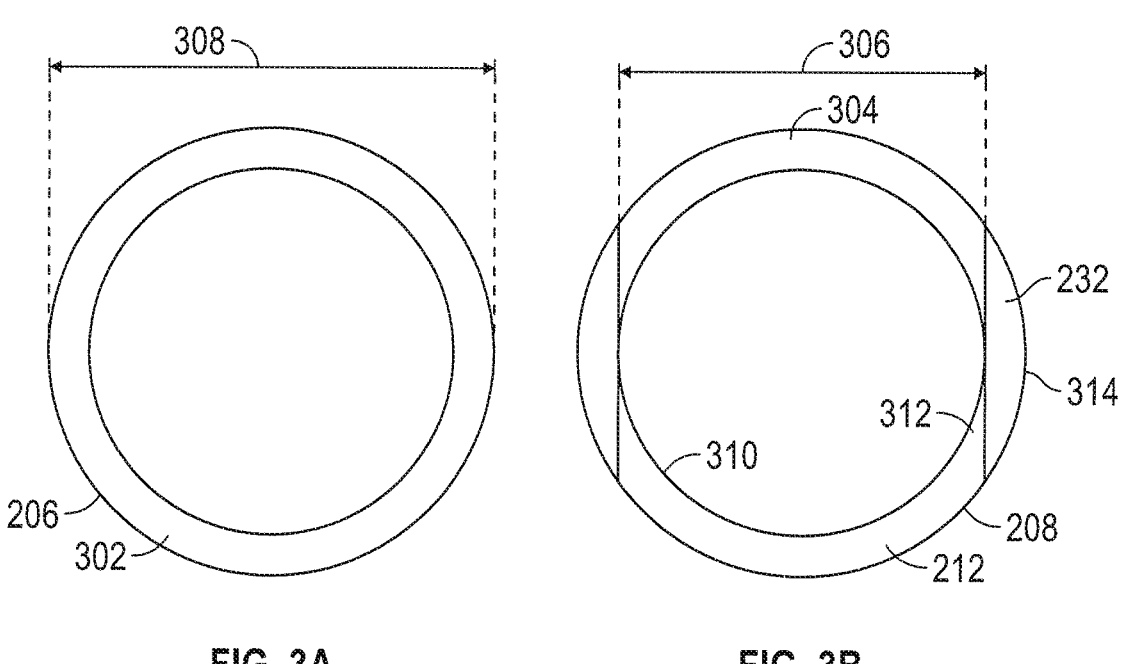
FIG. 3A                    FIG. 3B
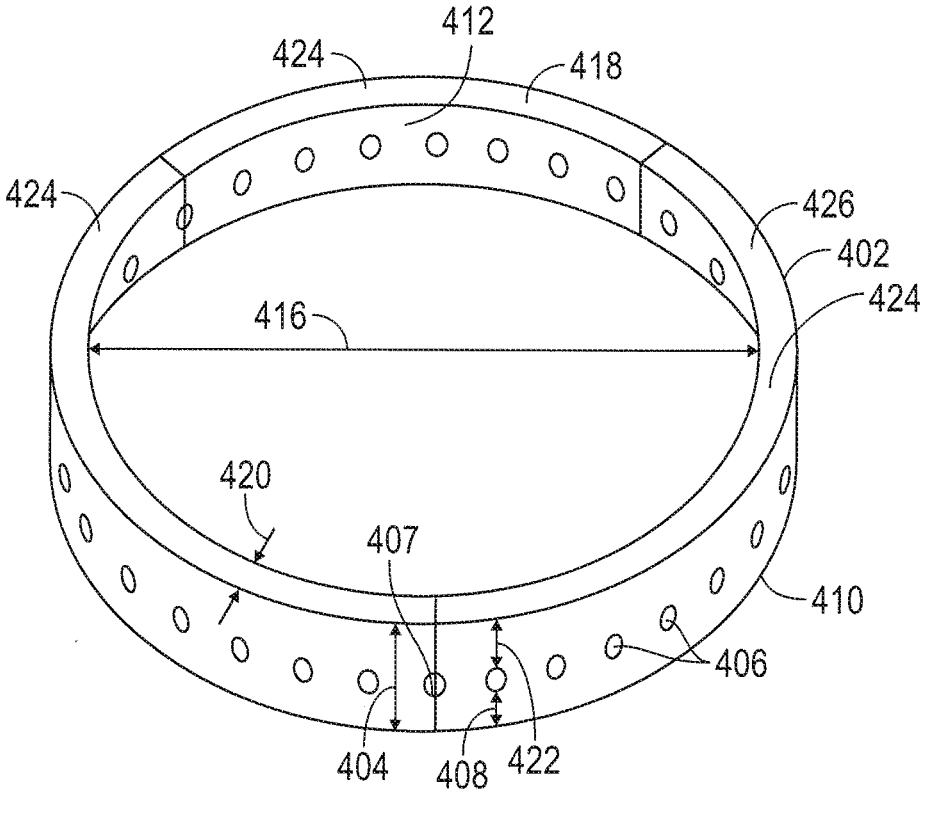
FIG. 4

206

228

229          1202   402
       424   1204  1206

228          424
                  227

227

216                                              204

208

804

299

1302

1306

1304          1308

1204

1202

ERODING ASSEMBLY FOR CHLORINATOR WITH REMOVABLE SIEVE AND WEIR

CROSS-REFERENCE TO RELATED APPLICATIONS

This application claims the benefit of U.S. Provisional Application No. 63/339,727 filed May 9, 2022.

STATEMENT REGARDING FEDERALLY SPONSORED RESEARCH OR DEVELOPMENT

Not Applicable.

BACKGROUND

Field

This invention relates generally to water-soluble chemical feeders where a solid chemical material, such as provided as tablet, granules and the like, is provided in a feeder and is eroded by water so as to produce a sanitizing solution of dissolved chemical material and water. In particular, the invention relates an eroding assembly having removable components in its structure for ease of cleaning and removal of any undissolved chemical material.

Description of the Related Art

Water-soluble chemicals in water sanitizing devices (also known as "chlorinators") are well known. Such chlorinators often are constructed to erode solid chemical materials such as calcium hypochlorite or other disinfection chemicals such as bromines, dichlorisocyanurates and trichlorisocyanurates for the purpose of disinfecting water. While these chemical materials may be provided as a solid, such as a tablet or granules, it is known that the supplied material may not be fully eroded and carried with the disinfecting water, resulting in an accumulation of chemical material within the chlorinator. Because such accumulation alters the flow rate and therefore the rate of erosion and composition of treated water, it is necessary to remove the chlorinator from service and remove the accumulation of remaining chemical material. Removal can result in undesirable down time.

Because of the nature of the disinfectant material, removal of remaining chemical material from the chlorinator may pose environmental and health risks. It is known that the eroding assemblies of chlorination devices may be subject to a build-up or accumulation of inert ingredients through passageways carrying the eroded solid chemical materials. This challenge may be accentuated where the water has a pH approaching 8.5, at which the water is considered "hard," and where scales can form. Such build-up requires regular disassembly and cleaning of the internal parts of the eroding assembly such as sieve plates, weirs and anywhere inside the system where such eroded solid chemical material accumulates. Performing maintenance and cleaning typically requires removal of all stored tablets. The partially dissolved material often includes solids, a soft almost "putty" like residue that emits a chlorine gas. Cleaning therefore requires breathing protection and is, at best, a labor intensive and unpleasant task. The process can be more challenging as systems are often neglected, resulting in clogging and poor performance and a greater exposure when cleaning. In addition to safety, there is a shortage of labor, especially in fields such as municipality maintenance and service, increasing potential risk. Maintenance can cause undesirable down time and safety concerns.

Moreover, because the installed components in the eroding assembly determine performance, such as rate of erosion of solid chemical material and size of eroded particulates permitted to enter the solution tank, any modification of the rate of erosion, such as in response to seasonal demand changes, requires removal of the system from operation, extensive disassembly, alteration, and re-assembly. Such modifications can result in undesirable down time.

It would therefore be an improvement to provide the eroding assembly for a chlorinator whose structure enables straightforward removal of accumulated chemical material and ready modification of performance characteristics.

SUMMARY

The present disclosure therefore meets the above needs and overcomes one or more deficiencies in the prior art by providing an eroding chamber having an eroding chamber upper member and an eroding chamber lower member, wherein the eroding chamber upper member and the eroding chamber lower member are defined by a slidably removable sieve plate, and the eroding chamber lower member is in communication with a mixing chamber tank, the slidably removable sieve plate has a sieve therethrough adapted to provide fluid communication between the eroding chamber upper member and the eroding chamber lower member, and a weir body is removably attached to the eroding chamber upper member and adapted to limit fluid communication from the eroding chamber upper member to a mixing chamber tank.

The present disclosure further provides an eroding assembly which includes an eroding chamber, a weir body, and a removable sieve plate. The eroding chamber has an eroding chamber upper member and an eroding chamber lower member, where the eroding chamber upper member has an eroding chamber upper member lower edge and an eroding chamber upper member profile and the eroding chamber lower member has an eroding chamber lower member upper edge, an eroding chamber bottom plate, the eroding chamber bottom plate having an opening therethrough, an eroding chamber lower member profile at the eroding chamber lower member upper edge, and an eroding chamber lower member inner diameter, where the eroding chamber upper member profile identical to the eroding chamber lower member profile, and the eroding chamber upper member lower edge is separated from the eroding chamber lower member upper edge by a first eroding chamber distance. The eroding chamber upper member and the eroding chamber lower member are maintained along a common central axis and separated by the first eroding chamber distance. The weir body has a plurality of weir perforations therethrough with a weir perforation lowest edge at a weir perforation height from a weir body bottom edge and contacts the eroding chamber upper member at a weir body upper section. The plurality of weir perforations are positioned below the eroding chamber upper member lower edge, where the weir body bottom edge is distant the eroding chamber lower member upper edge a sieve plate height, the sieve plate height less than the first eroding chamber distance, where the weir body has a weir body profile to fit about the eroding chamber upper member and the eroding chamber lower member, the weir body has a weir body inner diameter equal to an eroding chamber upper member outer diameter, the weir body has a weir body thickness, and the weir body has a weir body height greater than difference of the first eroding chamber distance and the sieve plate height. The removable sieve plate has a removable sieve plate first end and a removable sieve plate second end, a removable sieve plate first section, a removable sieve plate second section, and a removable sieve plate third section, where the removable sieve plate first section is adjacent the removable sieve plate first end, the removable sieve plate third section is adjacent the removable sieve plate second end, and the removable sieve plate second section is intermediate the removable sieve plate first section and the removable sieve plate third section. The removable sieve plate second section has the sieve plate height, and the removable sieve plate second section has a removable sieve plate second section length not less than the sum of the eroding chamber upper member outer diameter and twice the weir body thickness. The removable sieve plate second section has a sieve therethrough. The removable sieve plate is removably positionable in the eroding chamber in an interference fit between the weir body and the eroding chamber lower member and is slidably removable from the eroding chamber.

The present disclosure further provides an eroding assembly having an eroding chamber, a weir body, a removable sieve plate, a second removable sieve plate, a plurality of weir body retention clips, and two eroding chamber lower member keys. The eroding chamber has an eroding chamber upper member and an eroding chamber lower member, where the eroding chamber upper member has an eroding chamber upper member lower edge and an eroding chamber upper member profile, and the eroding chamber lower member has an eroding chamber lower member upper edge and an eroding chamber bottom plate, the eroding chamber bottom plate having an opening therethrough, an eroding chamber lower member profile at the eroding chamber lower member upper edge, and an eroding chamber lower member inner diameter, with the eroding chamber bottom plate having an opening therethrough. The eroding chamber upper member lower edge is separated from the eroding chamber lower member upper edge by a first eroding chamber distance. The eroding chamber upper member and the eroding chamber lower member are maintained along a common central axis and separated by the first eroding chamber distance. The weir body has a plurality of weir perforations therethrough with a weir perforation lowest edge at a weir perforation height from a weir body bottom edge. The weir body is adapted to contact the eroding chamber upper member at a weir body upper section with the weir body configured to be positioned about the eroding chamber wherein the weir perforation lowest edge is positioned below the eroding chamber upper member lower edge and the weir body bottom edge is distant the eroding chamber lower member upper edge a sieve plate height, which is less than the first eroding chamber distance, and the weir body having a weir body profile to fit about the eroding chamber upper member and the eroding chamber lower member, so the weir body has a weir body inner diameter equal to the eroding chamber upper member outer diameter. The weir body has a weir body thickness, and a weir body height greater than difference of the first eroding chamber distance and the sieve plate height. The removable sieve plate has a removable sieve plate first end and a removable sieve plate second end and has a removable sieve plate first section, a removable sieve plate second section, a removable sieve plate third section. The removable sieve plate first section is adjacent the removable sieve plate first end, the removable sieve plate third section is adjacent the removable sieve plate second end, the removable sieve plate second section is intermediate the removable sieve plate first section and the removable sieve plate third section. The removable sieve plate second section has the sieve plate height, and the removable sieve plate second section has a removable sieve plate second section length not less than the sum of the eroding chamber upper member outer diameter and twice the weir body thickness. The removable sieve plate second section has a sieve therethrough. The removable sieve plate is removably positionable in the eroding chamber in an interference fit between the weir body and the eroding chamber lower member and is slidably removable from the eroding chamber. The removable sieve plate first section has a removable sieve plate first section profile at the removable sieve plate first end adapted to facilitate imposition of the removable sieve plate into the eroding chamber between the eroding chamber lower member and the weir body and the removable sieve plate third section has a removable sieve plate third section profile at the removable sieve plate second end, the removable sieve plate third section profile complementary to the removable sieve plate first section profile. The second removable sieve plate has a second sieve therethrough which has a second erosion rate, different from the erosion rate of the sieve. The second removable sieve plate has a removable sieve plate first section profile at a second removable sieve plate first end complementary to the removable sieve plate third section profile. The removable sieve plate is adapted to be driven across the eroding chamber between the eroding chamber lower member and the weir body from an eroding chamber first side to an eroding chamber second side by the second removable sieve plate. The weir body is repositionable to provide the plurality of weir perforations at a weir perforation second height, has a plurality of weir body sections, and is resiliently flexible. The plurality of weir body retention clips are affixed to the eroding chamber adapted to removably laterally retain each of the plurality of weir body sections, and wherein at least one of the plurality of weir body retention clips is attached to the eroding chamber upper member. Each of the two eroding chamber lower member keys extends upward from the eroding chamber lower member upper edge at opposing sides of the eroding chamber lower member, the two eroding chamber lower member keys sized to tightly accommodate the removable sieve plate slidably positioned between them.

The present disclosure further provides an eroding assembly having an eroding chamber, a removable sieve plate, and a weir body. The eroding chamber has an eroding chamber upper member and an eroding chamber lower member. The eroding chamber upper member has an eroding chamber upper member lower edge while the eroding chamber lower member has an eroding chamber lower member upper edge. The eroding chamber lower member has a closed end, with a bottom drain therethrough opposite the eroding chamber lower member upper edge, which may be formed by an eroding chamber bottom plate. The eroding chamber upper member lower edge is separated from the eroding chamber lower member upper edge by a first eroding chamber distance. The removable sieve plate has a removable sieve plate first end and a removable sieve plate second end. The removable sieve plate has a removable sieve plate first section, a removable sieve plate second section, a removable sieve plate third section. The removable sieve plate first section is adjacent the removable sieve plate first end, the removable sieve plate third section is adjacent the removable sieve plate second end, the removable sieve plate second section is intermediate the removable sieve plate first section and the removable sieve plate third section. The removable sieve plate second section has a sieve therethrough adapted to provide fluid communication between the eroding chamber upper member and the eroding chamber lower member. The removable sieve plate is slidably removable from the eroding chamber. The weir body extends downwardly below the eroding chamber upper member. The weir body has a weir perforation lowest edge positioned below the eroding chamber upper member lower edge and a weir body bottom edge distant the eroding chamber lower member upper edge a sieve plate height. The weir body is configured to retain water above the removable sieve plate up to a weir height when the removable sieve plate is positioned between the eroding chamber upper member and the eroding chamber lower member and the weir body contacts the removable sieve plate and a sieve flow rate through the sieve is less than an eroding chamber flow rate into the eroding chamber.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings:

FIG. 3A provides a top view of the eroding chamber upper member.

FIG. 3B provides a top view of the eroding chamber lower member.

FIG. 4 provides a three-dimensional view of a weir body.

DETAILED DESCRIPTION

Figure 1:
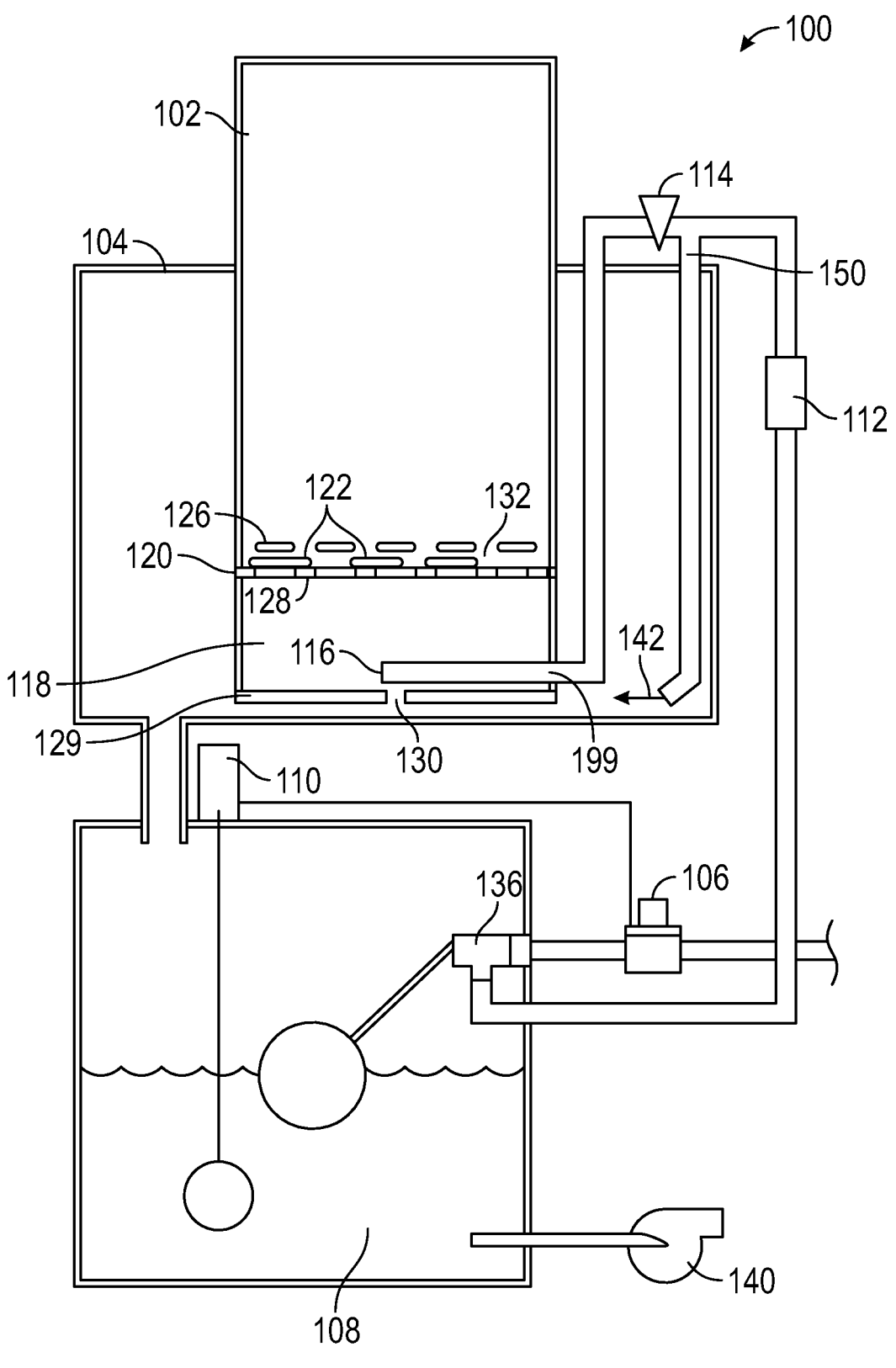
FIG. 1 provides an illustration of a typical prior art system.

Prior art systems include a water inlet, a chamber for dissolving solid chemical materials, often chlorine tablets, a chamber for further mixing and dilution of the solute the dissolved solid chemical materials, and a solution tank connected to an output pump. Referring to FIG. 1, a typical prior art system is illustrated.

In a typical water treatment system 100, an eroding chamber 102 is suspended into a mixing chamber tank 104 and contains within it the solid chemical materials. As flowing water 117, potentially bearing undesirable organic contaminants, flows into the typical water treatment system 100, the water passes through a solenoid valve 106, then passes through a float valve 136 before proceeding to the eroding chamber and the mixing chamber tank 104. Flow of the flowing water 117 into the typical water treatment system 100 is generally controlled by the solenoid valve 106 coupled to a float switch 110 in the solution tank 108. To ensure the solution tank 108 is not overfilled with chlorinated water from the mixing chamber tank 104, the solution tank 108 may be monitored with a float switch 110 coupled to the solenoid valve 106. A float valve 136 is provided intermediate the solenoid valve 106 and the outlet to the solution tank 108 to act as a fail-sale backup to prevent overflow of bypass water 142 and any treated water in case the solenoid valve 106 fails to close on command.

When the delivery of flowing water 117 into the typical water treatment system 100 is not terminated by the solenoid valve 106 and by the float valve 136, the flowing water 117 flows to flow limiter 112 before being directed into one or two streams by a valve 114. When open, the valve 114, permits some of the flowing water 117 to be directed down to the tangential pipe 116 into the vortex chamber 118 at the bottom of the eroding chamber 102 through a pipe entry 199. The vortex chamber 118 is defined as a cylinder, generally, by the round walls of the eroding chamber 102, a sieve plate 120, and a bottom plate 129. The balance of the flowing water 117 is bypassed downward by the valve 114 and directed to the mixing chamber tank 104 below the eroding chamber 102 as bypass water 142 via a bypass line 150.

At the bottom of the eroding chamber 102, below the sieve plate 120, in the vortex chamber 118, a vortex is generated by creating higher internal pressure around the inner periphery of the eroding chamber 102. The vortex and higher internal pressure forces water upward through the sieve plate 120 having a plurality of perforations 128, fixed in position at a specific height across the eroding chamber 102. As a result the water contacts and erodes a plurality of tablets 122 of solid chemical material. Some portion of the treated water passes through the weir body 132, constructed to prevent undissolved tablets from exiting the eroding chamber 102, and out of the eroding chamber 102 through elongated holes 126 in the weir body 132 through the side of the eroding chamber 102. The balance of the treated water, and any eroded solid chemical material too heavy to be carried by the treated water, passes down through the sieve plate 120 to mix with the combination of flowing water 117 in the vortex chamber 118 and any treated water drawn into the eroding chamber 102 through an opening 130. Because this weir body 132 is associated with weir perforations in the side of the eroding chamber, the weir body 132 is fixed in vertical position and in maximum flow rate.

Unfortunately, because the sieve plate 120 is fixed in position with the plurality of sieve plate perforations 128, its characteristics are likewise fixed. The only potential system alterations are the flow rates from the bypass line 150 into the mixing chamber tank 104 from the tangential pipe 116 which provides the flowing water 117 into the vortex chamber 118 to create a vortex therein. The stronger the vortex in the vortex chamber 118, the more re-circulation and mixing takes place before the resulting treated water finally either exits radially over the weir body 132 or out through the opening 130. A 45° fitting at the termination of the bypass line 150 directs the bypass water 142 into the preferably round vortex chamber, resulting in a circular motion to create the vortex. This vortex disturbs any solids in the bottom of the eroding chamber 102, causing further erosion and mixing, and causes some treated water to be drawn into the eroding chamber 102 from the mixing chamber 104 though the opening 130.

In operation, when the volume in the solution tank 108, which has a capacity of about 15 gallons, falls to around 5 gallons, the float switch 110 is activated to open the solenoid valve 106 to direct flowing water 117 to the float valve 136 and toward the eroding chamber 102 to generate more chlorinated water. The solenoid valve 106 opens and the process produces chlorinated water until the float switch 110 causes the solenoid valve 106 to cease flow. The treated water in the eroding chamber 102, and any bypass water 142, in the mixing chamber tank 104, combined to provide a chlorinated water drain by gravity to the solution tank 108 until the next cycle starts.

The dispensing pump 140 of the typical water treatment system 100 then delivers chlorinated water to the treatment destination on demand or otherwise as desired.

During operation, as solids are dissolved, remnants of the solid chemical material accumulate and clog the sieve and weir, requiring cleaning and removal of the accumulated material. Additionally, as the treated water flows downward, solid chemical material may precipitate out of any treated water remaining in the mixing chamber tank 104, such as due to a height of any fitting between the mixing chamber tank 104 and the solution tank 108 extending above the bottom of the mixing chamber tank 104. Cleaning the typical water treatment system 100 to remove accumulated solid chemical material from the sieve, weir, and or mixing chamber tank 104 requires the eroding chamber to be emptied and disassembled. Little water remains in the mixing chamber tank 104 during cleaning since the opening 130 down to the solution tank 108 is always open.

This need for periodic emptying and cleaning is a notable negative with tablet-based chlorinator systems. Particulates of the solid chemical material can collect in the through elongated holes 126 which form weir body 132 and in the plurality of perforations 128 in the sieve plate 120, clogging the system, restricting flow, and altering the treatment of the flowing water 117. Because the sieve plate 120 and the weir body 132 are integral to the eroding chamber 102 and because the bottom of the mixing chamber tank 104 is inaccessible, cleaning requires disassembly of the typical water treatment system 100 and removal and storage of remaining solid chemical material so the sieve plate 120 and the weir body 132 can be cleaned and the accumulated solid chemical material removed. Alteration of the system, such as to alter the rate or erosion or the volume retained by the weir body 132 requires disassembly of the typical water treatment system 100 and replacement of the entire eroding chamber 102. In addition to safety, there is a shortage of labor, especially in fields such as municipality maintenance and service.

The present disclosure provides a system which addresses the need for such extensive disassembly for cleaning or modification without the undesirable characteristics by use of the eroding assembly depicted in FIGS. 2-14 which includes The sieve plate 120 is thus removable, including while leaving remaining solid chemical material in position for continuing treatment, for cleaning. Likewise, when desired, the weir body make likewise an eroding assembly 200 with a two-member eroding chamber 204, supported by support stanchions 216, a weir body 402, and a removable sieve plate 602 in place of the conventional eroding chamber. The eroding assembly 200 provides improved access to critical components of the erosion process for cleaning and maintenance, improving consistency in chlorinator performance, reduced exposure to harmful chemicals to operating personnel, and simplify adjustments to system performance through exterior-mounted quick-change components, particularly a removable sieve and removable weir.

Figure 2:
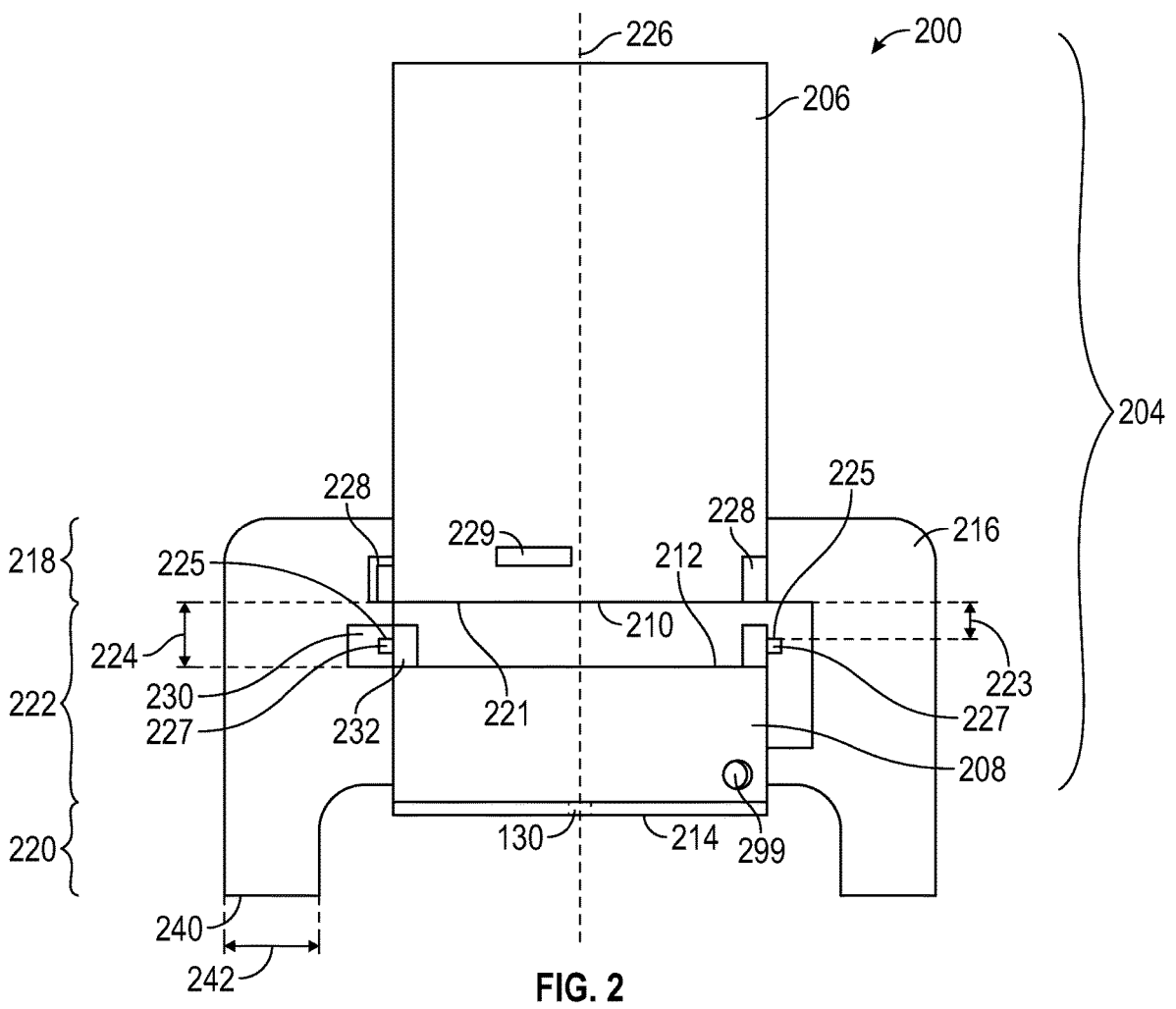
FIG. 2 provides an external side view of the eroding assembly and the two-member eroding chamber and two support stanchions.

Referring to FIG. 2, an external side view of the two-member eroding chamber 204 and two support stanchions is provided. The eroding chamber 204 may be provided with an eroding chamber upper member 206 and an eroding chamber lower member 208. The eroding chamber upper member 206 may have an eroding chamber upper member lower edge 210. The eroding chamber lower member 208 may have an eroding chamber lower member upper edge 212 at one and an eroding chamber bottom plate 214 at the opposite, and lower, end, where the eroding chamber bottom plate 214 has an opening 130 therethrough as a bottom drain. The eroding chamber lower member 208 includes a pipe entry 299 for input of the tangential pipe 116 and sealed against the mixing chamber 104. The eroding chamber bottom plate 214 may include one or more openings 130 for flow from the bottom of the eroding chamber 204 to a mixing chamber tank 104 or an improved mixing chamber tank 814 to ensure proper drainage when desired. The eroding assembly includes at least three support stanchions 216 to provide support, though more may be used when desired. Each of the three support stanchions 216 has a support stanchion first section 218, a support stanchion second section 220, and a support stanchion intermediate section 222 intermediate the support stanchion first section 218 and the support stanchion second section 220. The eroding chamber upper member 206 is affixed to each of the support stanchions 216 at the support stanchion first section 218 of each of the at least three support stanchions 216 and maintained level by the support stanchions 216. The eroding chamber lower member 208 is likewise affixed to each of the at least three support stanchions 216 at the support stanchion intermediate section 222 of each of the at least three support stanchions 216. The support stanchions 216 further maintain the eroding chamber upper member 206 and the eroding chamber lower member 208 along a common central axis 226 and keep the eroding chamber upper member lower edge 210 separated from the eroding chamber lower member upper edge 212 by a first eroding chamber distance 224 from the eroding chamber upper member bottom 221. The support stanchion second section 220 of each of the at least three support stanchions 216 extends beyond eroding chamber bottom plate 214 and thus maintains the eroding chamber 204 above the bottom of the mixing chamber tank 104.

Each of the at least three support stanchions 216 has a support stanchion foot 240 at the support stanchion second section 220 which has a support stanchion foot length 242.

Because the mixing chamber tank 104 must bear the weight of the eroding assembly 200, the two-member eroding chamber 204 and the water, and chemical materials retained therein, the support stanchion foot 240 may be constructed to distribute the load across a greater area by selection of an appropriate support stanchion foot length 242.

The eroding chamber lower member 208 may be cut or modified to have an eroding chamber lower member key 232 on each of its two sides where the eroding chamber lower member key 232 extends above the eroding chamber lower member upper edge 212 at opposing sides of the eroding chamber lower member 208, the two eroding chamber lower member keys 232 sized to tightly accommodate the removable sieve plate 602 slidably positioned between them. Each eroding chamber lower member key 232 provides a conic section where the eroding chamber lower member key straight surface 312, which mates against the removable sieve plate second section 606 of the removable sieve plate 602, is tangent to an eroding chamber lower member inner profile 310 at the midpoint of the eroding chamber lower member key straight surface 312 and the outer surface is provided by the eroding chamber lower member outer surface 314. The eroding chamber lower member key straight surface 312 of each eroding chamber lower member key 232 is parallel to the other. The two eroding chamber lower member keys 232 provide a keyway for installation of the removable sieve plate 602 through which the removable sieve plate 602 may be positioned and moved through the eroding chamber 204 between the eroding chamber lower member 208 and the weir body 402.

Referring to FIGS. 3A and 3B, top views of the eroding chamber upper member 206 and the eroding chamber lower member 208 are provided, respectively. The eroding chamber upper member 206 may have an eroding chamber upper member profile 302 while the eroding chamber lower member 208 may have an eroding chamber lower member profile 304 at the eroding chamber lower member upper edge 212, and an eroding chamber lower member inner diameter 306. The eroding chamber upper member profile 302 is identical to the eroding chamber lower member profile 304. Preferably, each of the eroding chamber upper member profile 302 and the eroding chamber lower member profile 304 are cylindrical.

Referring to FIG. 4, a three-dimensional view of a weir body 402 is provided. The weir body 402 has a plurality of weir perforations 406 therethrough with a weir perforation lowest edge 407 at a weir perforation height 408 from a weir body bottom edge 410. The weir body 402 has a weir body profile 418 to fit about the eroding chamber upper member 206 and the eroding chamber lower member 208. The weir body 402 has a weir body inner diameter 416 equal to the eroding chamber upper member outer diameter 308. When installed, the weir body 402 contacts the eroding chamber upper member 206 at a weir body upper section 412 and the plurality of weir perforations 406 are positioned below the eroding chamber upper member lower edge 210. The weir body 402 provides a dam, equal to the weir perforation height 408, which controls the depth of water retained in the eroding chamber 204. The weir body 402 has a weir body thickness 420, and a weir body height 404. The weir body 402 may be repositionable, such as by inverting, to provide the plurality of weir perforations 406 at a weir perforation second height 422. Thus, the weir perforations 406 are relocated from a weir perforation height 408 to the weir perforation second height 422, altering the depth of water retained in the eroding chamber 204. The flow rate through the weir body 402 may further be adjusted by the number and diameter of the weir perforations 406. The weir body 402 is preferably resiliently flexible. Additionally, the weir body 402 may comprise a plurality of weir body sections 424, which in combination surround the eroding chamber 204, except, when applicable, where any support stanchion 216 would interfere and otherwise impede flow from the eroding chamber 204 between the eroding chamber upper member 206 and the eroding chamber lower member 208. The weir body sections 424 may thus be sized to be less than a complete ring to account for the support stanchion 216. During cleaning, or for replacement, the weir body 402 or weir body sections 424 can be removed from the eroding assembly, cleaned and reinstalled, or replaced, without any tear down of the balance of the eroding chamber 204. Further, there is no requirement to remove the solid chemical material from the eroding chamber 204 for this weir body replacement or cleaning, permitting ease and speed of maintenance. Notably, these components permit the cleaning to be accomplished without creating increased issues. Due to the exposure to water and resulting erosion, the solid chemical material, particularly tablets, can form "bridges" of material between tablets. These bridges can become dislodged and provide bulky compositions of the solid chemical material, obstructing openings, such as those in the weir body 402. The present disclosure provides for removal of the weir body 402 for cleaning or replacement, which can be followed by removal of the removable sieve plate 602, which can result in removal of any remaining loose solid chemical material or disposition of that solid chemical material to a bottom of a mixing chamber tank 104, avoiding the weir body 402 becoming obstructed.

Referring to FIGS. 2 and 4, where the weir body 402 comprises a plurality of weir body sections, a plurality of weir body retention clips 228 may be affixed to the eroding chamber 204 to laterally removably retain each of the plurality of weir body sections 424. When desired, one or more of the plurality of weir body retention clips 228 may be integrated into any of the support stanchions 216. When desired, one or more of the plurality of weir body retention clips 228 may be attached to the eroding chamber upper member 206. Because the weir body 402 is flexible and has a profile consistent with the eroding chamber upper member 206 and the eroding chamber lower member 208, the weir body 402 may be provided from a thin plastic which can be laterally squeezed and fitted into the weir body retention clips 228. To aid in retention of positioning, one or more weir body vertical-position limiters 229, which may be a horizontal bar, may be positioned on the eroding chamber upper member 206 at a weir body top 426 of the weir body 402. Each of the weir body retention clips 228 may include a void, opening or shape sized to entirely or partially capture an end of a weir body section 424 when installed so to as removably laterally capture an end of a weir body section 424, whether by overlapping to capture when the weir body 402 is squeezed and flexed for installation or by surrounding its lateral end and therefore preventing movement both laterally and vertically. The weir body retention clips 228 may have a c-shape or an L-shape to provide the space between the weir body retention clips 228 and the eroding chamber upper member 206 for retention of the weir body 402. Alternatively, a weir body retention clip 228 may be affixed to a stanchion 216, 218 and provide a surface distant the eroding chamber upper member 206 sized to capture the weir body 402, such as separated by a weir body thickness 420. Such a weir body retention clip 228 affixed to a stanchion 216, 218 may be a rectangular prism, a triangular prism, or even a quarter-round prism.

Figure 5:
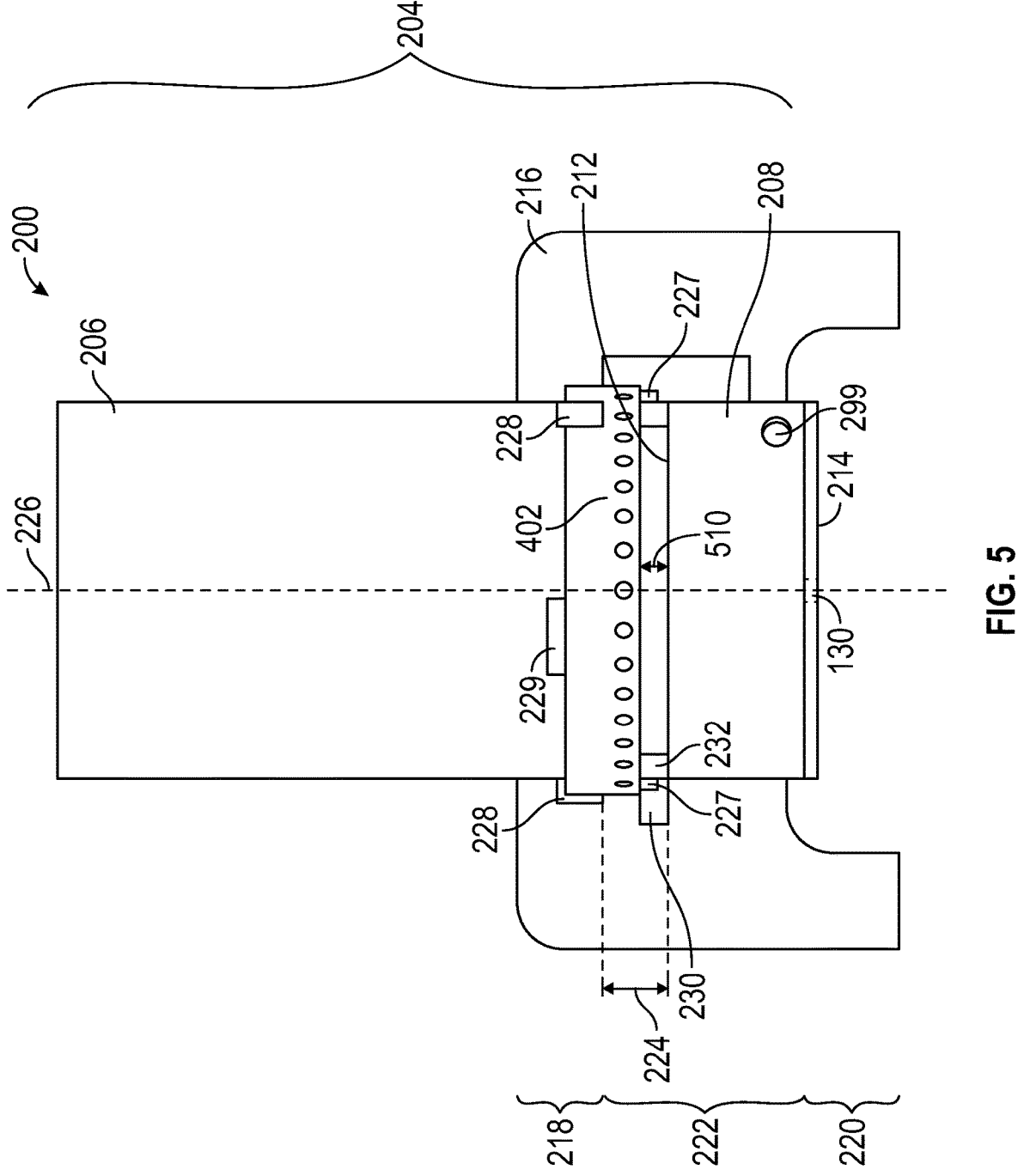
FIG. 5 provides an external side view of the two-member eroding chamber and two support stanchions with a weir body.

Referring to FIG. 5, an external side view of the two-member eroding chamber 204 and two support stanchions 216 with a weir body 402 is provided. When installed, the weir body bottom edge 410 is distant the eroding chamber lower member upper edge 212 by a sieve plate height 510, which is less than the first eroding chamber distance 224. The weir body height 404 is greater than difference of the first eroding chamber distance 224 and the sieve plate height 510.

Figure 6:
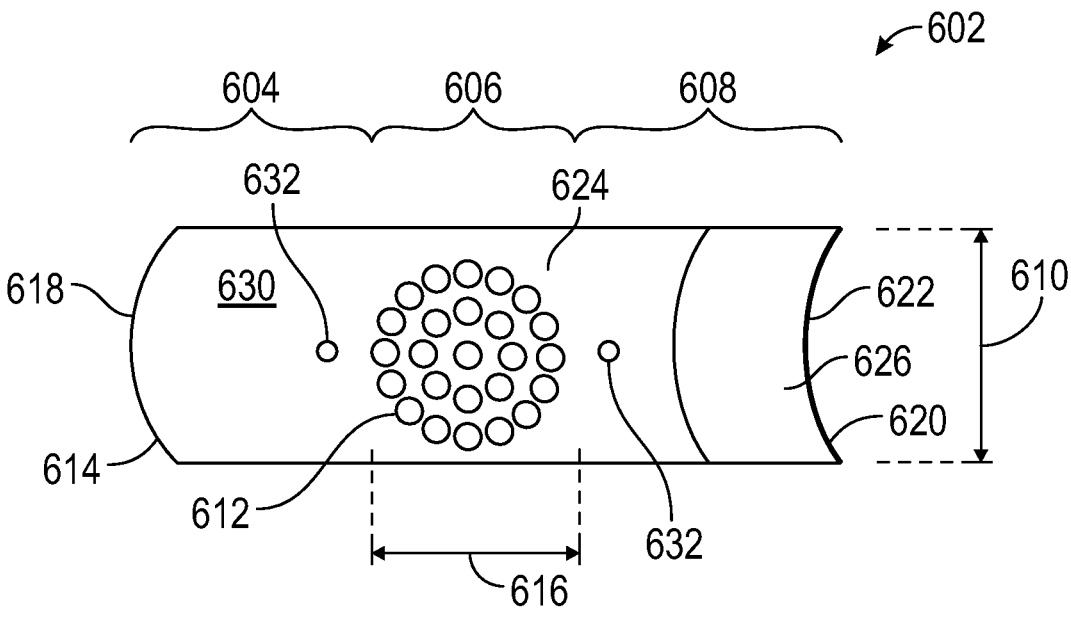
FIG. 6 provides a top view of a removable sieve plate.

Referring to FIG. 6, a top view of a removable sieve plate 602 is provided. The removable sieve plate 602 has a removable sieve plate first end 618 and a removable sieve plate second end 620. The removable sieve plate 602 has a removable sieve plate first section 604, a removable sieve plate second section 606, and a removable sieve plate third section 608. The removable sieve plate first section 604 is adjacent the removable sieve plate first end 618, while the removable sieve plate third section 608 is adjacent the removable sieve plate second end 620, with the removable sieve plate second section 606 intermediate the removable sieve plate first section 604 and the removable sieve plate third section 608. The removable sieve plate second section 606 and has a removable sieve plate second section length 616 not less than the sum of the eroding chamber upper member outer diameter 308 and twice the weir body thickness 420 and has a removable sieve plate second section width 610 preferably not less than the eroding chamber lower member inner diameter 306. In the absence of the eroding chamber lower member keys 232, the removable sieve plate second section width 610 may be greater than the sum of the eroding chamber upper member outer diameter 308 and twice the weir body thickness 420. The removable sieve plate second section 606 has the sieve plate height 510. The removable sieve plate second section 606 has a sieve 612 therethrough. The removable sieve plate first section 604 may have a profile to aid in installation of the sieve plate 602, such as a rounded front. The removable sieve plate second section 606 may be rectangular or may have another profile for introduction and removal while sealing against the eroding chamber upper member 206 and the eroding chamber lower member 208. The removable sieve plate first section 604 may have a removable sieve plate first section profile 614 at the removable sieve plate first end 618 adapted to facilitate imposition of the removable sieve plate 602 into the eroding chamber 204 between the eroding chamber lower member 208 and the weir body 402, and the removable sieve plate third section 608 may have a removable sieve plate third section profile 622 at the removable sieve plate second end 620, with the removable sieve plate third section profile 622 complementary to the removable sieve plate first section profile 614. When desired, the removable sieve plate 602 is constructed of a plurality of sieve plate members 624, 626. The removable sieve plate 602 is removably positionable in the eroding chamber 204 in an interference fit between the weir body 402 and the eroding chamber lower member 208 and the removable sieve plate 602 is slidably removable from the eroding chamber 204. The removable sieve plate 602 may be constructed of materials such as polyvinyl chloride and high-density polyethylene. The sieve 612 has a plurality of passages 628 therethrough which may be vertical or directional, such as diagonal or even curved.

Figure 7:
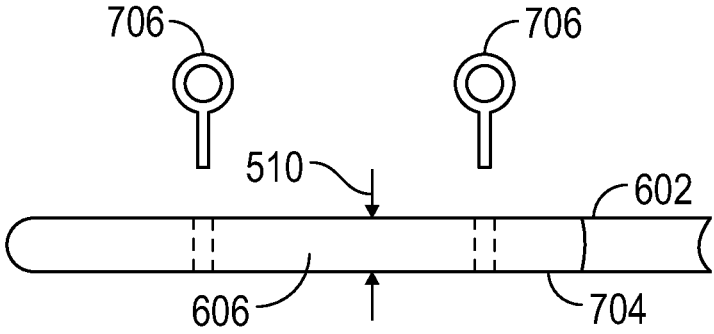
FIG. 7 provides a side view of the removable sieve plate.

Referring to FIG. 7, a side view of the removable sieve plate 602 is provided. The removable sieve plate second section 606 has the sieve plate height 510 and may be rectangular.

The eroding assembly 200 may therefore provide the eroding chamber 204, the removable sieve plate 602, and the weir body 402 such that the eroding chamber 204 has an eroding chamber upper member 206 and an eroding chamber lower member 208, where the eroding chamber upper member 206 and the eroding chamber lower member 208 are defined, and may be fully or partially separated, by the slidably removable sieve plate 602 and the eroding chamber lower member 208 is in communication with a mixing chamber tank 104. The slidably removable sieve plate 602 has a sieve 612 therethrough adapted to provide fluid communication between the eroding chamber upper member 206 and the eroding chamber lower member 208 while the weir body 402 is removably attached to the eroding chamber upper member 206 and adapted to limit fluid communication from the eroding chamber upper member 206 to a mixing chamber tank 104.

Figures 8, 9:
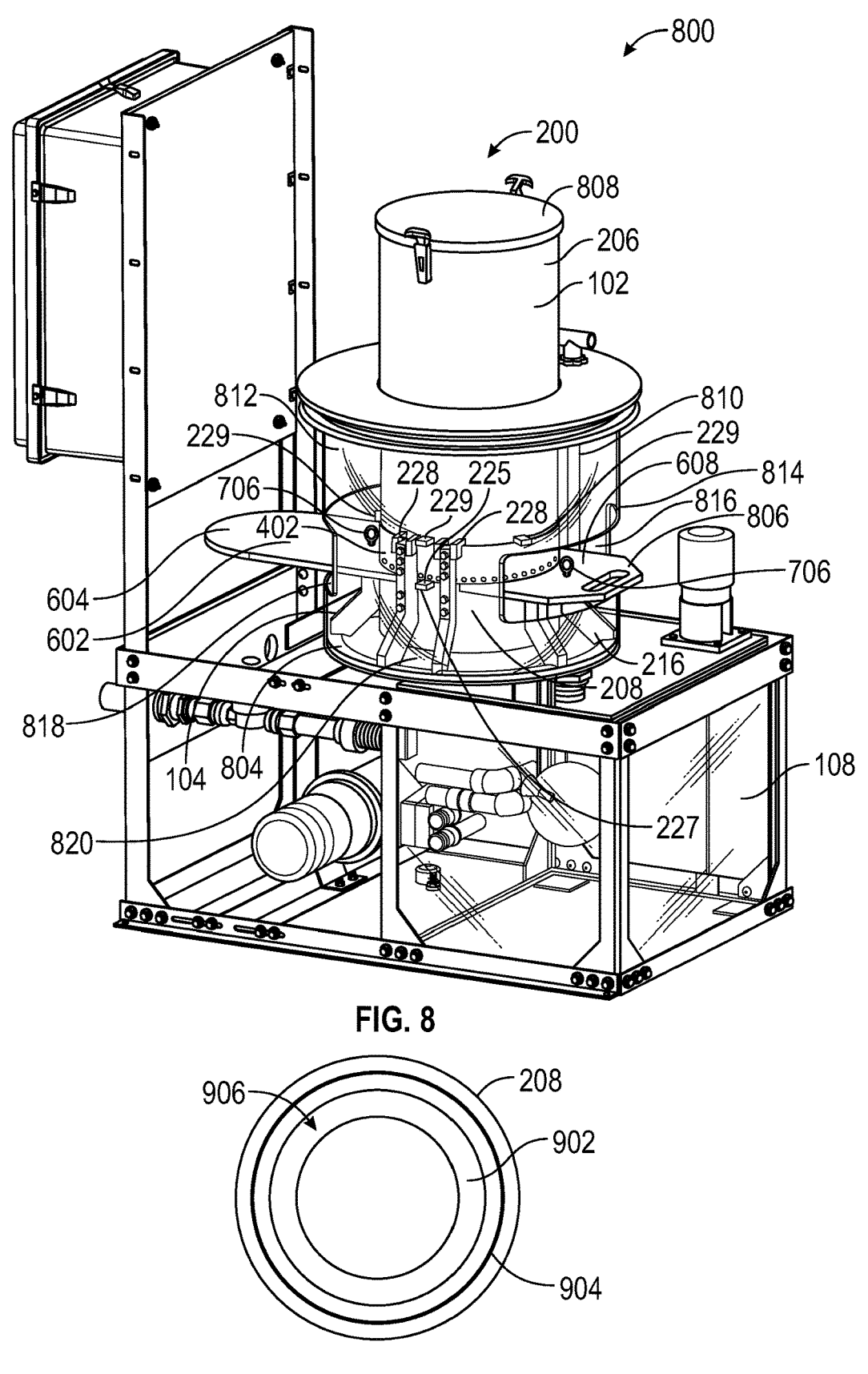
FIG. 8 provides a three-dimensional view of the improved water treatment system.
FIG. 9 provides a top view of the eroding chamber lower member with an internal weir.

Referring to FIG. 8, a view of an improved water treatment system 800 is provided. The improved water treatment system 800 includes the eroding chamber 204 positioned in an improved mixing chamber tank 814 sized to surround the eroding chamber 204. The eroding chamber 204 includes an eroding chamber lid 808 across the top of the eroding chamber upper member 206. An eroding chamber base ring 804 may be provided intermediate the support stanchion second section 220 of each of the at least three support stanchions 216 and an improved mixing chamber tank bottom 820 of the improved mixing chamber tank 814. The removable sieve plate third section 608 may include a handle 806.

The eroding assembly 200 may include the improved mixing chamber tank 814 adapted for use with the eroding chamber 204. The improved mixing chamber tank 814 includes an improved mixing chamber tank first opening 816 through the improved mixing chamber tank 814 aligned with the eroding chamber first side 810 and sized to permit movement of the removable sieve plate 602 through, into, and out of the eroding chamber 204. The improved mixing chamber tank 814 may further include an improved mixing chamber tank second opening 818 through the improved mixing chamber tank 814 aligned with the eroding chamber second side 812 and sized to permit movement of the removable sieve plate 602 through, into, and out of the eroding chamber 204. Because the improved mixing chamber tank 814 communicates with the eroding chamber 204, each of the improved mixing chamber tank first opening 816 and the improved mixing chamber tank second opening 818 extends downward to at least align with the eroding chamber lower member upper edge 212 and may extend further downward and extends upward to at least align with the eroding chamber upper member bottom edge 221 and may extend further upward and has a width greater than the removable sieve plate second section width 610. The improved mixing chamber tank first opening 816 and the improved mixing chamber tank second opening 818 thus provide external access to the improved mixing chamber tank bottom 820 without need for disassembly.

As illustrated in FIG. 8, as the weir body height 404 is greater than difference of the first eroding chamber distance 224 and the sieve plate height 510, the weir body 402 provides a body which spans from the eroding chamber upper member 206 to the eroding chamber lower member 208 except where the removable sieve plate 602 passes through. Where necessary, as illustrated in FIG. 9, the weir body 402 may partially extend downward below the removable sieve plate bottom surface 704 to provide a sufficient fit.

Referring to FIGS. 2, 6, 7, and 8, when the removable sieve plate 602 is installed between the eroding chamber upper member 206 and the eroding chamber lower member 208, one or more weir body vertical-position limiters 229 hold the weir body 402 firmly against a removable sieve plate upper surface 630 and strengthen a seal between a removable sieve plate bottom surface 704 and the eroding chamber lower member upper edge 212 by pressing the two consistently tight with an interference fit.

Referring again to FIG. 5, because the weir body 402 encircles the eroding chamber 204 and it retained in place by the plurality of weir body retention clips 228 and because the one or more weir body vertical-position limiters 229 hold the weir body 402 firmly against the removable sieve plate upper surface 630 where external the eroding chamber 204, it may be desirable to provide a corresponding surface on the eroding chamber 204, an eroding chamber ledge 227 for those locations where the removable sieve plate 602 is not external. Two eroding chamber ledges 227 may be provided, where each eroding chamber ledge 227 extends outward from the eroding chamber lower member 208 at one of the two eroding chamber lower member keys 232, where each eroding chamber ledge 227 has an eroding chamber ledge top 225 positioned coplanar with the eroding chamber lower member upper edge 212. Each eroding chamber ledge top 225 is positioned not higher than a weir body bottom distance 223 from the eroding chamber upper member bottom edge 221, the weir body bottom distance 223 equal to the difference of the first eroding chamber distance 224 and the sieve plate height 510. As a result, the weir body 402 terminates not higher than the top of the removable sieve plate 602 and may extend below the top of the removable sieve plate 602 when desired.

Referring again to FIG. 2, each of the eroding chamber lower member keys 232 has a height not greater than the sieve plate height 510 as the removable sieve plate upper surface 630 provides a seal against the eroding chamber upper member bottom edge 221. A height of the eroding chamber lower member keys 232 greater than the sieve plate height 510 would prevent removable installation of the removable sieve plate 602.

Referring to FIG. 9, a top view of the eroding chamber lower member 208 is provided. An internal weir 902 may be provided within the eroding chamber lower member 208 from the eroding chamber bottom plate 214 to the eroding chamber lower member upper edge 212, with the internal weir 902 reducing the internal diameter of the eroding chamber 204 in the eroding member lower member 208 and therefore reducing the volume of fluid in the eroding chamber 204 and providing a further seal location for the removable sieve plate 602.

When desired, an O-ring 904 may be provided at the eroding chamber lower member upper edge 212 when eroding chamber lower member keys 232 are not present, and therefore provide a further seal against the removable sieve plate 602. Alternatively, when eroding chamber lower member keys 232 are not present and the internal weir 902 is used, the O-ring 904 may be provided on the internal weir 902 at an internal weir top 906.

Figures 10, 11:
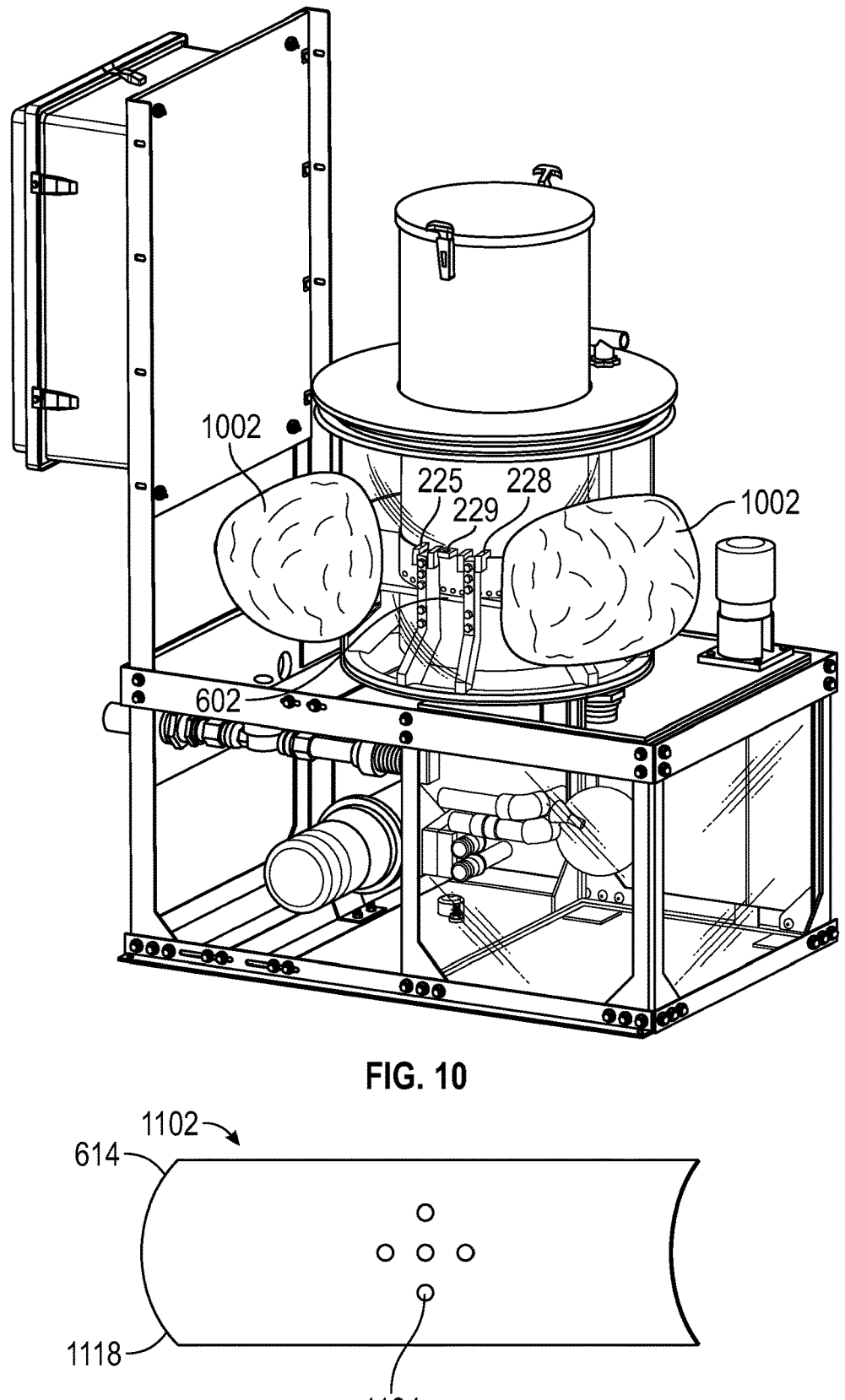
FIG. 10 provides a three-dimensional view of the improved water treatment system with a jacket about an improved mixing chamber tank.
FIG. 11 provides a top view of a second removable sieve plate.

Referring to FIG. 10, a three-dimensional view of the improved water treatment system with a jacket about the improved mixing chamber tank 814 is provided. One or more external flexible jackets 1002 may be affixed externally to the improved mixing chamber tank 814 about the improved mixing chamber tank first opening 816 and the improved mixing chamber tank second opening 818. The external flexible jackets 1002 may thereby prevent insect or particle contamination of the improved mixing chamber tank 814.

Referring to FIG. 11, a top view of a second removable sieve plate 1102 is provided. The second removable sieve plate 1102 is provided with a second sieve 1104 therethrough, where the second sieve 1104 has a second erosion rate, different from the erosion rate of the sieve 612. The second sieve 1104's erosion rate may differ from the erosion rate the sieve 612 because of differences in geometry for the perforations therethrough. The second removable sieve plate 1102 may have a removable sieve plate first section profile 614 at a second removable sieve plate first end 1118 complementary to the removable sieve plate third section profile 622, where the removable sieve plate 602 may be adapted to be driven across the eroding chamber 204 between the eroding chamber lower member 208 and the weir body 402 from an eroding chamber first side 810 to an eroding chamber second side 812 by the second removable sieve plate 1102. Providing a second removable sieve plate 1102 which a complementary profile and which can be mated to the removable sieve plate 602 aids in removal of the existing removable sieve plate 602 without the need to remove the contents of the eroding chamber. The second removable sieve plate 1102 may provide a greater or lower erosion rate, such as needed for climate changes, or may prevent any erosion, which may be preferably for cleaning of the existing removable sieve plate 602. This avoids the need to remove the solid chemical material contained therein and permits on-demand alteration of the erosion rate and/or replacement of the existing sieve 612.

When desired, the removeable sieve plate 602 may include one or more position locks to ensure the removable sieve plate 602 is not inadvertently removed while bearing any solid chemical material without a second removable sieve plate 1102 in abutment to shift the load of solid chemical material. The position lock is adapted to maintain the removable sieve plate 602 relative to the eroding chamber 204. Referring to FIGS. 6, 7 and 8, this position lock may include one or more keyholes 632 into which a retaining key 706 may be placed to retain the removable sieve plate 602. A key 706 may include a pin sized to fit into the keyhole 632 and a head to prevent the key from passing entirely through the keyhole 632. The eroding assembly 200 may thus include a key 706, wherein the removable sieve plate 602 includes a keyhole 632 therethrough, the key 706 sized to engage the keyhole 632.

Figures 12, 13:
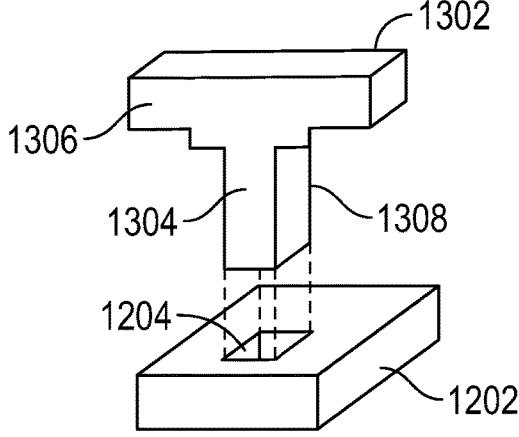
FIG. 12 provides a three-dimensional view of a weir body and the associated retention components.
FIG. 13 provides a three-dimensional view of the vertical weir retention member.

Referring to FIG. 12, a three-dimensional view of a weir body and the associated retention components is provided at the eroding chamber first side 810. The weir body section 424 is positioned about the eroding chamber upper member 206 and retained by retention clips 228 and a weir body vertical-position limiter 229 may benefit from a vertical weir body retention member 1202 to provide sufficient retention to prevent the weir body section 424 from moving downward in the absence of the removable sieve plate 602. The weir body vertical-position limiter 229 having vertical weir body retention member 1202 may be positioned on the eroding chamber upper member 206 adjacent a weir body top 426 of the weir body 402 and include a vertical weir body retention member passage 1204 sized to accept a vertical weir body retention member key to provide force against the weir body section 424 and to retain in position in the absence of the removable sieve plate 602.

Referring to FIG. 13, a three-dimensional view of the vertical weir body retention member 1202 and the vertical weir body retention member key 1302 is provided. Sized to fit through the vertical weir body retention member passage 1204, a vertical weir body retention member key shaft 1304 depends from a vertical weir body retention member key head 1306 and is adapted to be positioned to apply force against the weir body section 424 and thereby against the eroding chamber upper member 206 to retain the weir body section 424 in position in the absence of the removable sieve plate 602. The vertical weir body retention member key shaft 1304 may therefore have a surface to increase friction against the weir body section 424 and/or may have a protuberance 1308 to mesh with a weir body section valley 1206 across the face of the weir body section 424.

Figure 14:
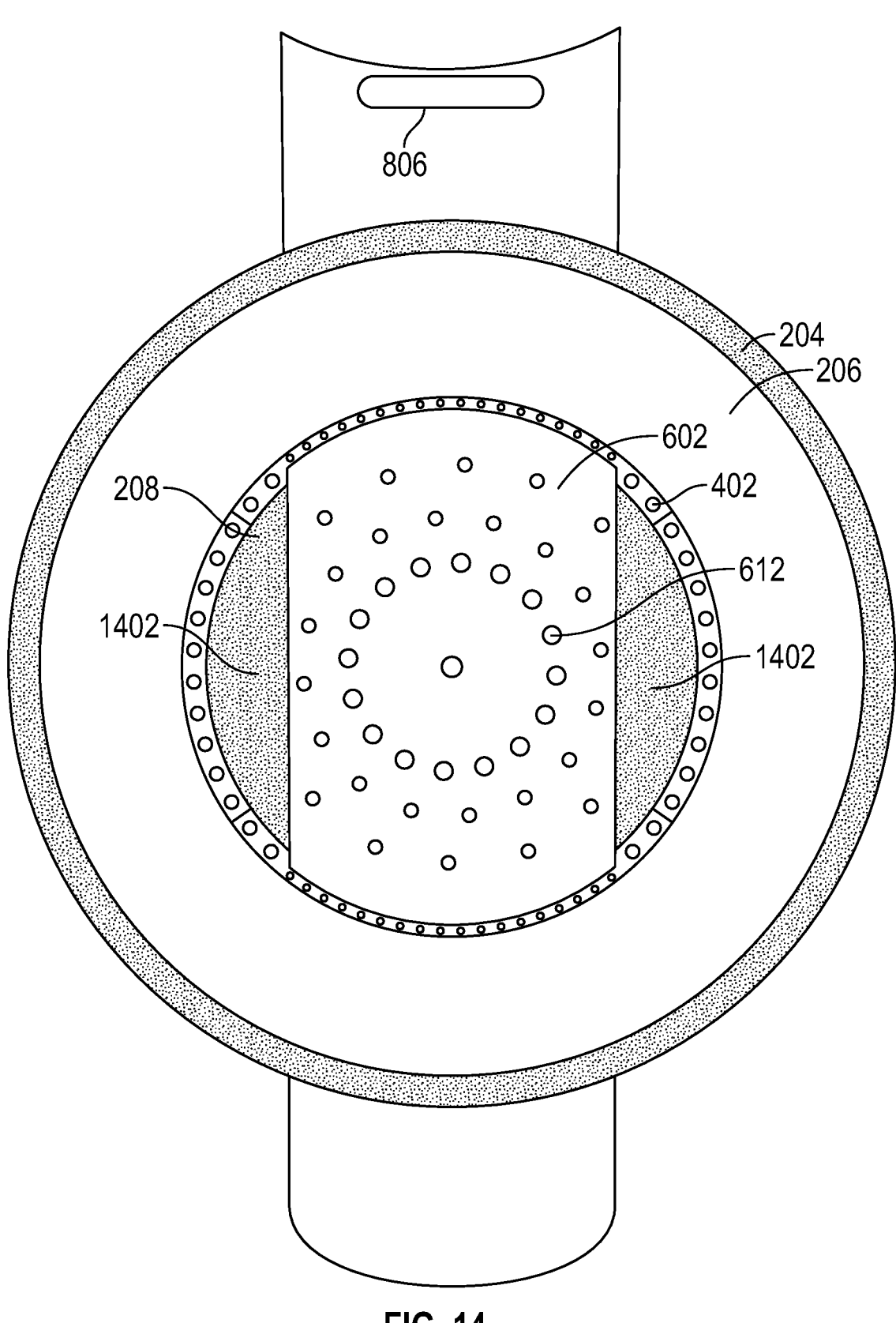
FIG. 14 provides a top view of the eroding chamber with a removable sieve plate positioned through the eroding chamber where the removable sieve plate is one selected where the removable sieve plate second section width is less than the eroding chamber lower member inner diameter and slides between two additional plates to provide a solid platform adjacent the weir body.

Referring to FIG. 14, a top view of the eroding chamber 204 with a removable sieve plate 602 positioned through the eroding chamber 204, where the removable sieve plate 602 is one selected where the removable sieve plate second section width 610 is less than the eroding chamber lower member inner diameter 306 and slides between two additional plates 1402 to provide a solid platform adjacent the weir body 402.

Referring again to FIG. 2, when desired, one or more of the support stanchions 216 may be provided with a notch. As one or more of the at least three support stanchions 216 may be a vertical column positioned adjacent the eroding chamber 204, it may be necessary to ensure clearance for the removable sieve plate 602. Therefore, at least one of the at least three support stanchions 216 may include a notch 230 therethrough adapted to contact or accommodate the removable sieve plate 602. Where the eroding chamber 204 is cylindrical, the support stanchions 216 will necessarily be adjacent less than the outer diameter of the eroding chamber 204, requiring at least one, if not all, support stanchions 216 having a notch 230 aligned with the eroding chamber lower member upper edge 212 and the weir bottom edge 410 with sufficient depth to provide an opening between the support stanchions 216 sufficient to accommodate the removable sieve plate 602.

The eroding assembly 200 thereby provides for cleaning or replacement of the sieve 602, weir body 402, and improved mixing chamber tank 814 without the need to disassemble the water treatment system and without the need for exposure to or contact with the solid chemical material. When the sieve 612 is in need of cleaning, or is due for cleaning or replacement, the sieve 612 can be removed to a well-ventilated area with sufficient safeguards and then cleaned. Beneficially, this can be done without substantial interruption of operation as a second sieve plate 612 can be installed to continue supporting the solid chemical material and permit continued operation. Similarly, the weir body 402 may be readily removed, it can be removed or replaced, where replacement can permit the cleaning of the first weir body 402 without long interruption in use. Because the sieve plate 612 and the weir body 402 can be altered, the rate of erosion of chemical material can be altered largely by altering the flow rate and therefore pressure of the flowing water 117, which can cause exceed the capacity of the water treatment system 100, causing it to shut down. Likewise, when the improved mixing chamber tank bottom 820 requires cleaning, it can be accessed and washed via the improved mixing chamber tank first opening 816 and/or the improved mixing chamber tank second opening 818.

An eroding assembly 200 is thus provided having an eroding chamber 204, a slidably removable sieve plate 602, and a weir body 402, where the eroding chamber 204 has an eroding chamber upper member 206 and an eroding chamber lower member 208, where the eroding chamber upper member 206 and the eroding chamber lower member 208 are defined by the slidably removable sieve plate 602, where the eroding chamber lower member 208 is in communication with a mixing chamber tank 104, where the slidably removable sieve plate 602 has a sieve 612 therethrough adapted to provide fluid communication between the eroding chamber upper member 206 and the eroding chamber lower member 208, and where the weir body 402 is removably attached to the eroding chamber upper member 206 and is adapted to limit fluid communication from the eroding chamber upper member 206 to a mixing chamber tank 104.

The present disclosure thus provides an eroding assembly 200 having an eroding chamber 204, a removable sieve plate 602, and a weir body 402. The eroding chamber 204 has an eroding chamber upper member 206 and an eroding chamber lower member 208. The eroding chamber upper member 206 has an eroding chamber upper member lower edge 210 while the eroding chamber lower member 208 has an eroding chamber lower member upper edge 212. The eroding chamber lower member is closed at its bottom by an eroding chamber bottom plate, the eroding chamber bottom plate having an opening therethrough. The opening 130 ensures that, when water is not provided to the eroding chamber 204, most or all water remaining in the eroding chamber 204 can drain to the mixing chamber 104 and conceivably to the solution tank 108. The eroding chamber upper member lower edge 210 is separated from the eroding chamber lower member upper edge 212 by a first eroding chamber distance 224. The removable sieve plate 602 has a removable sieve plate first end 618 and a removable sieve plate second end 620. The removable sieve plate 602 has a removable sieve plate first section 604, a removable sieve plate second section 606, a removable sieve plate third section 608. The removable sieve plate first section 604 is adjacent the removable sieve plate first end 618, the removable sieve plate third section 608 is adjacent the removable sieve plate second end 620, the removable sieve plate second section 606 is intermediate the removable sieve plate first section 604 and the removable sieve plate third section 608. The removable sieve plate second section 606 has a sieve 612 therethrough adapted to provide fluid communication between the eroding chamber upper member 206 and the eroding chamber lower member 208. The removable sieve plate 602 is slidably removable from the eroding chamber 204. The weir body 402 extends below and downward of the eroding chamber upper member 206. The weir body 402 has a weir perforation lowest edge 407 positioned below the eroding chamber upper member lower edge 210. The weir body 402 is configured to retain water above the removable sieve plate 602 up to a weir perforation height 408 when the removable sieve plate 602 is positioned between the eroding chamber upper member 206 and the eroding chamber lower member 208 and the weir body 402 contacts the removable sieve plate 602 and a sieve flow rate through the sieve 612 is less than an eroding chamber flow rate into the eroding chamber 204.

The weir body 402 may be formed with the eroding chamber upper member 206 to be one unit, may be attached to the eroding chamber upper member 206, or may encircle the eroding chamber upper member 206 to form a body around it. The weir body 402 may be removable or fixed. The weir body 402 has a weir 430 positioned below the eroding chamber upper member lower edge 210 to permit water above the removable sieve plate 602 to exit the eroding chamber 204 once a defined volume is met, which occurs when the water reaches a weir perforation height 408. The weir body may have one weir perforation 406 or a plurality of weir perforations 406 with a weir perforation lowest edge 407 when the eroding chamber flow rate into the eroding chamber 204 exceeds the sieve flow rate through the sieve 612. Each weir perforation 406 permits fluid communication from within the eroding chamber 202 to outside the eroding chamber 202. The weir perforation height 408 may be permanent or may be adjustable, such as by adjustable external dams or by inversion or 180 degree rotation of the weir body 402. The weir 430 is thus above the sieve 612 at the weir perforation height 408. The weir perforation lowest edge 407 may be associated with one or more rectangular or round cut weir perforations 406 through the weir body 402. The weir perforation lowest edge 407 may be different from the weir perforation second height 422 to provide a different weir perforation height 408 upon inversion or 180 degree rotation of the weir body 402. The weir body 402 has a weir body bottom edge 410 distant the eroding chamber lower member upper edge 212 by a sieve plate height 510.

The foregoing disclosure and description is illustrative and explanatory thereof. Various changes in the details of the illustrated construction may be made within the scope of the appended claims without departing from the spirit of the disclosure. The present disclosure should only be limited by the following claims and their legal equivalents.

We claim:

1. An eroding assembly, comprising:
   an eroding chamber,
      the eroding chamber having an eroding chamber upper member and an eroding chamber lower member,
      the eroding chamber upper member having an eroding chamber upper member lower edge and an eroding chamber upper member profile,
      the eroding chamber lower member having an eroding chamber lower member upper edge, an eroding chamber bottom plate, the eroding chamber bottom plate having an opening therethrough, an eroding chamber lower member profile at the eroding chamber lower member upper edge, and an eroding chamber lower member inner diameter,
         the eroding chamber upper member profile identical to the eroding chamber lower member profile,
         the eroding chamber lower member having a pipe entry for input of a tangential pipe entry and sealed against the mixing chamber, and
         the eroding chamber upper member lower edge separated from the eroding chamber lower member upper edge by a first eroding chamber distance;
      the eroding chamber upper member and the eroding chamber lower member maintained along a common central axis and separated by the first eroding chamber distance;
   a weir body,
      the weir body having a plurality of weir perforations therethrough with a weir perforation lowest edge at a weir perforation height from a weir body bottom edge,
      the weir body adapted to contact the eroding chamber upper member at a weir body upper section,
      the weir body configured to be positioned about the eroding chamber wherein the weir perforation lowest edge is positioned below the eroding chamber upper member lower edge and
      the weir body bottom edge by distant the eroding chamber lower member upper edge a sieve plate height, the sieve plate height less than the first eroding chamber distance, the weir body having a weir body profile to fit about the eroding chamber upper member and the eroding chamber lower member,
      the weir body having a weir body inner diameter equal to an eroding chamber upper member outer diameter,
      the weir body having a weir body thickness, and
      the weir body having a weir body height greater than difference of the first eroding chamber distance and the sieve plate height; and
   a removable sieve plate,
      the removable sieve plate having a removable sieve plate first end and a removable sieve plate second end,
      the removable sieve plate having a removable sieve plate first section, a removable sieve plate second section, a removable sieve plate third section,
         the removable sieve plate first section adjacent the removable sieve plate first end,
         the removable sieve plate third section adjacent the removable sieve plate second end, the removable sieve plate second section intermediate the removable sieve plate first section and the removable sieve plate third section,
      the removable sieve plate second section having the sieve plate height,
      the removable sieve plate second section having a removable sieve plate second section length not less than the sum of the eroding chamber upper member outer diameter and twice the weir body thickness,
      the removable sieve plate second section having a sieve therethrough,
      the removable sieve plate removably positionable in the eroding chamber in an interference fit between the weir body and the eroding chamber lower member, and
      the removable sieve plate slidably removable from the eroding chamber.

2. The eroding assembly of claim 1, further comprising:
   at least three support stanchions, each of the at least three support stanchions having a support stanchion first section, a support stanchion second section, and a support stanchion intermediate section intermediate the support stanchion first section and the support stanchion second section,
      the eroding chamber upper member affixed to each of the at least three support stanchions at the support stanchion first section of each of the at least three support stanchions,
      the eroding chamber lower member affixed to each of the at least three support stanchions at the support stanchion intermediate section of each of the at least three support stanchions,
      the support stanchion second section of each of the at least three support stanchions extending beyond the eroding chamber bottom plate, and
   the at least three support stanchions maintaining the eroding chamber upper member and the eroding chamber lower member along the common central axis and separated by the first eroding chamber distance.

3. The eroding assembly of claim 2, further comprising:
   an eroding chamber base ring intermediate the support stanchion second section of each of the at least three support stanchions and a bottom of a mixing chamber tank.

4. The eroding assembly of claim 2, wherein:

at least one of the at least three support stanchions includes a notch therethrough adapted to accommodate the removable sieve plate.

5. The eroding assembly of claim 1, further comprising:

the removable sieve plate first section having a removable sieve plate first section profile at the removable sieve plate first end adapted to facilitate imposition of the removable sieve plate into the eroding chamber between the eroding chamber lower member and the weir body, and the removable sieve plate third section having a removable sieve plate third section profile at the removable sieve plate second end, the removable sieve plate third section profile complementary to the removable sieve plate first section profile.

6. The eroding assembly of claim 5, further comprising:

a second removable sieve plate with a second sieve therethrough, the second sieve having a second erosion rate, the second erosion rate different from an erosion rate of the sieve.

7. The eroding assembly of claim 6, wherein:

the second removable sieve plate having a removable sieve plate first section profile at a second removable sieve plate first end complementary to the removable sieve plate third section profile, and the removable sieve plate is adapted to be driven across the eroding chamber between the eroding chamber lower member and the weir body from an eroding chamber first side to an eroding chamber second side by the second removable sieve plate.

8. The eroding assembly of claim 1, wherein:

the removable sieve plate is constructed of a plurality of sieve plate members.

9. The eroding assembly of claim 1, further comprising:

the removable sieve plate third section including a handle.

10. The eroding assembly of claim 1, further comprising:

an internal weir within the eroding chamber lower member from the eroding chamber bottom plate to the eroding chamber lower member upper edge, the internal weir reducing the internal diameter of the eroding chamber with the eroding member lower member.

11. The eroding assembly of claim 1, wherein:

the weir body repositionable to provide the plurality of weir perforations at a weir perforation second height.

12. The eroding assembly of claim 1, further comprising:

an O-ring provided at one of the eroding chamber lower member upper edge or at an internal weir top of an internal weir, the internal weir within the eroding chamber lower member from the eroding chamber bottom plate to the eroding chamber lower member upper edge, the internal weir reducing the internal diameter of the eroding chamber with the eroding member lower member.

13. The eroding assembly of claim 1, wherein:

the removable sieve plate second section is rectangular.

14. The eroding assembly of claim 1, wherein:

the weir body having a plurality of weir body sections.

15. The eroding assembly of claim 14, further comprising:

a plurality of weir body retention clips affixed to the eroding chamber adapted to removably laterally retain each of the plurality of weir body sections.

16. The eroding assembly of claim 1, further comprising:

at least three support stanchions, each of the at least three support stanchions having a support stanchion first section, a support stanchion second section, and a support stanchion intermediate section intermediate the support stanchion first section and the support stanchion second section, the eroding chamber upper member affixed to each of the at least three support stanchions at the support stanchion first section of each of the at least three support stanchions, the eroding chamber lower member affixed to each of the at least three support stanchions at the support stanchion intermediate section of each of the at least three support stanchions, the support stanchion second section of each of the at least three support stanchions extending beyond the eroding chamber bottom plate, and the at least three support stanchions maintaining the eroding chamber upper member and the eroding chamber lower member along the common central axis and separated by the first eroding chamber distance;

the weir body being resiliently flexible and having the plurality of weir body sections;

a plurality of weir body retention clips affixed to the eroding chamber adapted to removably laterally retain each of the plurality of weir body sections;

wherein at least one of the plurality of weir body retention clips is integrated in one of the at least three support stanchions or attached to the eroding chamber upper member.

17. The eroding assembly of claim 16, further comprising:

a weir body vertical-position limiter, the weir body vertical-position limiter being a horizontal bar positioned on the eroding chamber upper member adjacent a weir body top of the weir body, wherein the weir body vertical limiter maintains force on the weir body against the removable sieve plate and an interference fit between the removable sieve plate and the eroding chamber lower member.

18. The eroding assembly of claim 17, wherein each of the plurality of weir body retention clips entirely or partially captures an end of the weir body section.

19. The eroding assembly of claim 17 wherein:

the weir body vertical-position limiter includes a vertical weir body retention member having a vertical weir body retention member passage vertically therethrough sized to accept a vertical weir body retention member key adapted to provide force against the weir body section.

20. The eroding assembly of claim 1, further comprising:

two eroding chamber lower member keys, each of the two eroding chamber lower member keys extending upward from the eroding chamber lower member upper edge at opposing sides of the eroding chamber lower member, the two eroding chamber lower member keys sized to tightly accommodate the removable sieve plate slidably positioned between them.

21. The eroding assembly of claim 1, further comprising:

at least three support stanchions, each of the at least three support stanchions having a support stanchion first section, a support stanchion second section, and a support stanchion intermediate section intermediate the support stanchion first section and the support stanchion second section, the eroding chamber upper member affixed to each of the at least three support stanchions at the support stanchion first section of each of the at least three support stanchions, the eroding chamber lower member affixed to each of the at least three support stanchions at the support stanchion intermediate section of each of the at least three support stanchions, the support stanchion second section of each of the at least three support stanchions extending beyond the eroding chamber bottom plate, and the at least three support stanchions maintaining the eroding chamber upper member and the eroding chamber lower member along the common central axis and separated by the first eroding chamber distance;

the weir body having a plurality of weir body sections;

a plurality of weir body retention clips affixed to the eroding chamber adapted to removably retain each of the plurality of weir body sections;

wherein at least one of the plurality of weir body retention clips is integrated in one of the at least three support stanchions or attached to the eroding chamber upper member, wherein the weir body is resiliently flexible;

a weir body vertical-position limiter, the weir body vertical-position limiter being a horizontal bar positioned on the eroding chamber upper member adjacent a weir body top of the weir body, wherein the weir vertical limiter maintains force on the weir body against the removable sieve plate and an interference fit between the removable sieve plate and the eroding chamber lower member;

two eroding chamber lower member keys, each of the two eroding chamber lower member keys extending upward from the eroding chamber lower member upper edge at opposing sides of the eroding chamber lower member, the two eroding chamber lower member keys sized to tightly accommodate the removable sieve plate slidably positioned between them;

two eroding chamber ledges, each eroding chamber ledge extending outwardly from the eroding chamber lower member at one of the two eroding chamber lower member keys, each eroding chamber ledge having an eroding chamber ledge top, each eroding chamber ledge top coplanar with the eroding chamber lower member upper edge, each eroding chamber ledge top positioned not higher than a weir body bottom distance from the eroding chamber upper member bottom edge, the weir body bottom distance equal to the difference of the first eroding chamber distance and the sieve plate height.

22. The eroding assembly of claim 1 wherein:

the removable sieve plate second section has a removable sieve plate second section width not less than the eroding chamber lower member inner diameter.

23. The eroding assembly of claim 1, further including a position lock adapted to maintain the removable sieve plate relative to the eroding chamber.

24. The eroding assembly of claim 23, further comprising:

a key, wherein the removable sieve plate includes a keyhole therethrough, the key sized to engage the keyhole.

25. The eroding assembly of claim 24, further comprising:

at least three support stanchions, each of the at least three support stanchions having a support stanchion first section, a support stanchion second section, and a support stanchion intermediate section intermediate the support stanchion first section and the support stanchion second section, the eroding chamber upper member affixed to each of the at least three support stanchions at the support stanchion first section of each of the at least three support stanchions, the eroding chamber lower member affixed to each of the at least three support stanchions at the support stanchion intermediate section of each of the at least three support stanchions, the support stanchion second section of each of the at least three support stanchions extending beyond the eroding chamber bottom plate, and the at least three support stanchions maintaining the eroding chamber upper member and the eroding chamber lower member along the common central axis and separated by the first eroding chamber distance, an eroding chamber base ring intermediate the support stanchion second section of each of the at least three support stanchions and a bottom of a mixing chamber tank;

the weir body having a plurality of weir body sections;

a plurality of weir body retention clips affixed to the eroding chamber adapted to removably laterally retain each of the plurality of weir body sections;

wherein at least one of the plurality of weir body retention clips is integrated in one of the at least three support stanchions.

26. An eroding assembly, comprising:

an eroding chamber, the eroding chamber having an eroding chamber upper member and an eroding chamber lower member, the eroding chamber upper member having an eroding chamber upper member lower edge and an eroding chamber upper member profile, the eroding chamber lower member having an eroding chamber lower member upper edge, an eroding chamber bottom plate, an eroding chamber lower member profile at the eroding chamber lower member upper edge, and an eroding chamber lower member inner diameter, the eroding chamber bottom plate having an opening therethrough, the eroding chamber lower member having a pipe entry for input of a tangential pipe entry and sealed against the mixing chamber, the eroding chamber upper member lower edge separated from the eroding chamber lower member upper edge by a first eroding chamber distance; and the eroding chamber upper member and the eroding chamber lower member maintained along a common central axis and separated by the first eroding chamber distance;

a weir body, the weir body having a plurality of weir perforations therethrough with a weir perforation lowest edge at a weir perforation height from a weir body bottom edge, the weir body adapted to contact the eroding chamber upper member at a weir body upper section, the weir body configured to be positioned about the eroding chamber wherein the weir perforation lowest edge is positioned below the eroding chamber upper member lower edge and the weir body bottom edge distant the eroding chamber lower member upper edge by a sieve plate height, the weir body having a weir body profile to fit about the eroding chamber upper member and the eroding chamber lower member, the weir body having a weir body inner diameter equal to an eroding chamber upper member outer diameter, the weir body having a weir body thickness, and the weir body having a weir body height greater than difference of the first eroding chamber distance and the sieve plate height;

a removable sieve plate, the removable sieve plate having a removable sieve plate first end and a removable sieve plate second end, the removable sieve plate having a removable sieve plate first section, a removable sieve plate second section, a removable sieve plate third section, the removable sieve plate first section adjacent the removable sieve plate first end, the removable sieve plate third section adjacent the removable sieve plate second end, the removable sieve plate second section intermediate the removable sieve plate first section and the removable sieve plate third section, the removable sieve plate second section having the sieve plate height, the removable sieve plate second section having a removable sieve plate second section length not less than the sum of the eroding chamber upper member outer diameter and twice the weir body thickness, the removable sieve plate second section having a sieve therethrough, the removable sieve plate removably positionable in the eroding chamber in an interference fit between the weir body and the eroding chamber lower member, the removable sieve plate slidably removable from the eroding chamber;

the removable sieve plate first section having a removable sieve plate first section profile at the removable sieve plate first end adapted to facilitate imposition of the removable sieve plate into the eroding chamber between the eroding chamber lower member and the weir body;

the removable sieve plate third section having a removable sieve plate third section profile at the removable sieve plate second end, the removable sieve plate third section profile complementary to the removable sieve plate first section profile;

a second removable sieve plate with a second sieve therethrough, the second sieve having a second erosion rate, the second erosion rate different from an erosion rate of the sieve;

the second removable sieve plate having a removable sieve plate first section profile at a second removable sieve plate first end complementary to the removable sieve plate third section profile;

the removable sieve plate is adapted to be driven across the eroding chamber between the eroding chamber lower member and the weir body from an eroding chamber first side to an eroding chamber second side by the second removable sieve plate;

the weir body repositionable to provide the plurality of weir perforations at a weir perforation second height;

the weir body having a plurality of weir body sections;

a plurality of weir body retention clips affixed to the eroding chamber adapted to removably laterally retain each of the plurality of weir body sections;

wherein at least one of the plurality of weir body retention clips is attached to the eroding chamber upper member;

wherein the weir body is resiliently flexible; and two eroding chamber lower member keys, each of the two eroding chamber lower member keys extending upward from the eroding chamber lower member upper edge at opposing sides of the eroding chamber lower member, the two eroding chamber lower member keys sized to tightly accommodate the removable sieve plate slidably positioned between them.

27. The eroding assembly of claim 26, further comprising:

an improved mixing chamber tank, the improved mixing chamber tank sized to surround the eroding chamber, the improved mixing chamber tank having an improved mixing chamber tank first opening through the improved mixing chamber tank aligned with an eroding chamber first side and sized to permit movement of the removable sieve plate through, into, and out of the eroding chamber;

the improved mixing chamber tank first opening extending downward to at least align with the eroding chamber lower member upper edge and extending upward to at least align with an eroding chamber upper member bottom edge and having a width greater than a removable sieve plate second section width;

wherein the removable sieve plate second section has a removable sieve plate second section width, the removable sieve plate second section width being not less than the eroding chamber lower member inner diameter.

28. The eroding assembly of claim 27, further comprising:

an external flexible jacket affixed externally to the improved mixing chamber tank about the improved mixing chamber tank first opening.

29. An eroding assembly, comprising:

an eroding chamber, the eroding chamber having an eroding chamber upper member and an eroding chamber lower member, the eroding chamber upper member and the eroding chamber lower member defined by a slidably removable sieve plate, the eroding chamber lower member in communication with a mixing chamber tank, the slidably removable sieve plate having a sieve therethrough adapted to provide fluid communication between the eroding chamber upper member and the eroding chamber lower member, a weir body removably attached to the eroding chamber upper member and adapted to limit fluid communication from the eroding chamber upper member to a mixing chamber tank.

30. An eroding assembly, comprising:

an eroding chamber, the eroding chamber having an eroding chamber upper member and an eroding chamber lower member, the eroding chamber upper member having an eroding chamber upper member lower edge, the eroding chamber lower member having an eroding chamber lower member upper edge, the eroding chamber lower member having a pipe entry for input of a tangential pipe entry and sealed against the mixing chamber, an eroding chamber bottom plate at a bottom of the eroding chamber lower member, the eroding chamber bottom plate having an opening therethrough, the eroding chamber upper member lower edge separated from the eroding chamber lower member upper edge by a first eroding chamber distance;

a removable sieve plate, the removable sieve plate having a removable sieve plate first end and a removable sieve plate second end, the removable sieve plate having a removable sieve plate first section, a removable sieve plate second section, a removable sieve plate third section, the removable sieve plate first section adjacent the removable sieve plate first end, the removable sieve plate third section adjacent the removable sieve plate second end, the removable sieve plate second section intermediate the removable sieve plate first section and the removable sieve plate third section, the removable sieve plate second section having a sieve therethrough adapted to provide fluid communication between the eroding chamber upper member and the eroding chamber lower member, and the removable sieve plate slidably removable from the eroding chamber, and a weir body, the weir body extending below the eroding chamber upper member, the weir body having a weir perforation lowest edge positioned below the eroding chamber upper member lower edge, the weir body having a weir body bottom edge distant the eroding chamber lower member upper edge a sieve plate height, the weir body configured to retain water above the removable sieve plate up to a weir height when the removable sieve plate is positioned between the eroding chamber upper member and the eroding chamber lower member and the weir body contacts the removable sieve plate and a sieve flow rate through the sieve is less than an eroding chamber flow rate into the eroding chamber.

\* \* \* \* \*